United States Patent [19]

Kiyono et al.

[11] 4,213,925
[45] Jul. 22, 1980

[54] PROCESS FOR CONTINUOUSLY PRODUCING FOAMED SHEETS

[75] Inventors: Hiroshi Kiyono, Ohtsu; Akio Ishimoto, Kashihara; Yoichiro Noda, Saitama; Kozo Yada, Shiga, all of Japan

[73] Assignee: Sekisui Kagaku Kogyo Kabushiki Kaisha, Japan

[21] Appl. No.: 933,575

[22] Filed: Aug. 14, 1978

Related U.S. Application Data

[62] Division of Ser. No. 785,293, Apr. 6, 1977, Pat. No. 4,124,344.

[30] Foreign Application Priority Data

Apr. 9, 1976 [JP] Japan .................................. 51-40624

[51] Int. Cl.² ............................................. B29D 27/00
[52] U.S. Cl. .......................................... 264/22; 264/25; 264/54; 264/555; 264/101; 264/210.1; 264/DIG. 5; 264/DIG. 18
[58] Field of Search ...................... 264/25, 54, 555, 22, 264/101, 210.1, DIG. 5, DIG. 18; 425/4 C

[56] References Cited

U.S. PATENT DOCUMENTS

| | | | |
|---|---|---|---|
| 3,711,584 | 1/1973 | Sagane et al. | 264/54 X |
| 3,762,845 | 10/1973 | Sagane et al. | 425/4 C |
| 4,124,344 | 11/1978 | Kiyono et al. | 264/25 X |

FOREIGN PATENT DOCUMENTS 47-24269  5/1972  Japan ........................................ 264/51

*Primary Examiner*—Philip Anderson
*Attorney, Agent, or Firm*—Wenderoth, Lind & Ponack

[57] ABSTRACT

A plastic foamed sheet of excellent quality is produced by preheating in a chamber including a conveyor means for continuously conveying a thermoplastic resin sheet containing a heat-decomposable blowing agent in the horizontally supported state and a heating means for heating the sheet to a temperature lower than the decomposition temperature of the blowing agent, and foaming in a foaming chamber connected to the preheating chamber and including a heating means for heat-foaming the sheet as it is continuously conveyed while being perpendicularly suspended from the terminal of the conveyor means.

21 Claims, 3 Drawing Figures

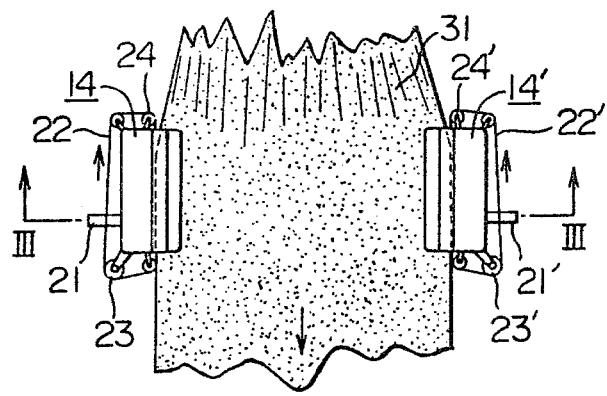
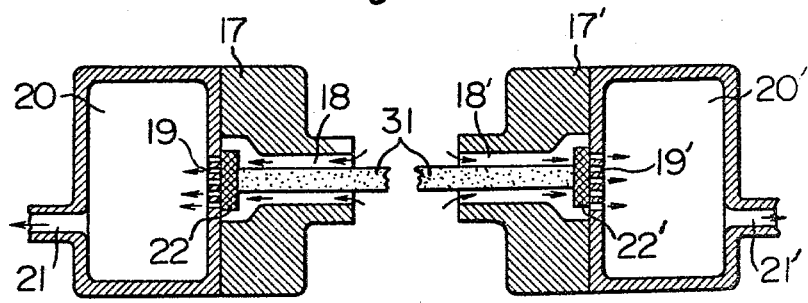

PROCESS FOR CONTINUOUSLY PRODUCING FOAMED SHEETS

This is a division of application Ser. No. 785,293, filed Apr. 6, 1977 now U.S. Pat. No. 4,124,344.

BACKGROUND OF THE INVENTION

This invention relates to a process for continuously producing a foamed sheet. More specifically, the invention relates to a process which can be advantageously used for producing a foamed sheet by heat-foaming a thermoplastic resin sheet having the property of foaming upon heating.

A technique for producing a foamed sheet has been widely known heretofore which comprises applying ionizing radiation, organic peroxides, etc. to a sheet made of a thermoplastic resin such as polyethylene containing an organic blowing agent, and then heating the resulting cross-linked sheet.

In the continuous production of a foamed sheet, the general practice has been a "horizontal-type" foaming method in which an unfoamed sheet is heated while it is being conveyed horizontally on a belt conveyor. This method, however, has the defect that during the three-dimensional expansion of the unfoamed sheet, the foamed sheet sticks to the belt conveyor, and its free expansion is impeded to cause non-uniformity in thickness and an increase in wrinkles. As another defect, the surface condition of the foamed sheet differs between that surface which makes contact with the belt conveyor and the uncontacted surface, and the commercial value of the sheet is thus reduced. In an attempt to remedy these defects, it has been suggested to cause the sheet to be afloat on a hot liquid bath such as ethylene glycol, or to support the sheet by applying hot air thereto from under the sheet. These methods, however, encounter considerable difficulties, and can scarcely remove the aforesaid defects.

A "vertical-type" foaming apparatus, such as disclosed in U.S. Pat. No. 3,711,584, is also known. This apparatus includes a preheating chamber and a foaming chamber connected to each other vertically with a partitioning apertured wall therebetween, in which a sheet fed from the top of the preheating chamber is foamed while it is caused to descend perpendicularly through the preheating chamber and foaming chamber. With such an apparatus, the sheet does not make contact with a belt conveyor or the like, and can be uniformly heated from both surfaces. Thus, it is convenient for obtaining a uniformly foamed sheet without a difference in condition between the two surfaces.

In such a vertical foaming apparatus, the sheet undergoes preheating while it is suspended from the feed opening of the preheating chamber to the sheet exit of the foaming chamber. The sheet softened by preheating, therefore, expands in the lengthwise direction by its own weight. Foamed sheets obtained by foaming in the extended state have distorted cells, and therefore, shrink during subsequent processing such as heat-welding. In other words, the conventional vertical-type foaming apparatus cannot afford foamed sheets having good dimensional stability. Furthermore, with the conventional vertical foaming apparatus, the sheet undergoes vibration and develops curls because the apparatus is without a supporting device. The vibration and curling are likely to cause the sheet to contact the apparatus. In order to avoid contact between the sheet and the apparatus, it is necessary to enlarge the sheet feed opening of the preheating chamber, the apertures in the partitioning wall between the preheating chamber and the foaming chamber, and the sheet exit of the foaming chamber, and to increase the distance between the sheet and the heating device. As a result, however, the heat of the foaming chamber moves into the preheating chamber, and the heat of the preheating chamber escapes from the sheet feed opening. The sheet efficiency is thus reduced, and it is difficult to control the level of heat in the preheating chamber. Furthermore, since curling of the sheet increases the temperature distribution of the sheet, foaming does not begin uniformly. Thus, expansion is not effected uniformly in the three-dimensional directions, and the individual foamed portions melt-adhere to one another to increase the curling of the end portions of the foamed sheet. This defect becomes greater at higher heating temperatures. Because the inside of the apparatus must be heated to a greater extent in order to increase the output in an apparatus of the same scale by increasing the sheet feeding speed, the above defect means that with the conventional vertical-type foaming apparatus, it is almost impossible to increase the output. In the production of foamed sheets having a large width, on the other hand, the curling of the sheet increases, and therefore, the sheet feed opening must be enlarged. This results in reduced heat efficiency and causes difficulty of heat control. Hence, in order to increase the output in the conventional vertical-type foaming apparatus, it is necessary to increase the lengths of the preheating chamber and the foaming chamber, and the apparatus as a whole naturally becomes large-sized. In a large-sized apparatus, the distance over which the sheet is suspended increases, and the various defects described become more outstanding.

SUMMARY OF THE INVENTION

Accordingly, it is a primary object of this invention to remove the various defects of the conventional vertical-type foaming apparatus.

Another object of this invention is to provide a process for continuously producing a foamed sheet having low heat shrinkage and good dimensional stability.

Still another object of the invention is to provide a process for continuously producing a foamed sheet, which permits good heat efficiency and a simplified control of heat.

A further object of the invention is to provide a process for continuously producing a foamed sheet which can increase the output of the foamed sheet without enlarging the apparatus itself.

Other objects of the invention will become apparent from the following description.

These objects of the present invention are achieved by a process employing an apparatus comprising a preheating chamber and a foaming chamber connected to the bottom of the preheating chamber, the preheating chamber including a conveyor means for continuously conveying a thermoplastic resin sheet containing a heat-decomposable blowing agent in the horizontally supported state and a heating means for heating a sheet to a temperature lower than the decomposition temperature of the blowing agent to soften it. The foaming chamber includes a heating means for heat-foaming the sheet as it is continuously conveyed while being perpendicularly suspended from the terminal or downstream end portion of the conveyor means. The process comprises heating a thermoplastic resin sheet containing a heat-decomposable blowing agent to a temperature lower than the decomposition temperature of the blowing agent to soften the sheet while it is being conveyed in a horizontal state, and then heating the sheet to a temperature above the decomposition temperature of the blowing agent while suspending the sheet perpendicularly thereby to form the sheet.

The thermoplastic resin sheet containing a heat-decomposable blowing agent, a starting material in the present invention, is produced, for example, by extrusion-molding a mixture consisting of a thermoplastic resin and a heat-decomposable blowing agent into the desired size in a customary manner.

Examples of the thermoplastic resin are low-density polyethylene, medium-density polyethylene, high-density polyethylene, an ethylene/vinyl acetate copolymer, an ethylene/propylene copolymer, an ethylene/butadiene copolymer, an ethylene/butene-1 copolymer, an ethylene/vinyl chloride copolymer, polypropylene, and polyvinyl chloride. The low-density polyethylene is especially preferred. These thermoplastic resins preferably have an average molecular weight of 10,000 to 300,000. In order to impart elasticity and other desirable properties, an elastomer such as natural rubber, butyl rubber, polyisobutylene, styrene/butadiene rubber, polybutadiene, or polyisoprene may be added to these thermoplastic resins.

The heat-decomposable blowing agent is a compound which is solid at room temperature, has a higher decomposition temperature than the molding temperature of the resin used, and when heated to a temperature above the decomposition temperature, decomposes while evolving a gas such as nitrogen, carbon dioxide, or ammonia. Examples of the blowing agent are azodicarbonamide, metal salts of azodicarbonamide, hydrazodicarbonamide, 4,4'-oxybis(benzenesulfonyl semicarbazide), bisbenzenesulfonyl hydrazide, and N,N'-dinitrosopentamethylenetetramine. The amount of the blowing agent used is not limited in particular, and can be optionally determined according to the desired expansion factor. The preferred amount is 1 to 100 parts by weight, especially 1 to 80 parts by weight, per 100 parts by weight of the resin. In order to decompose the blowing agent at a suitable temperature, a conventional foaming aid, such as zinc stearate, lead stearate, or aluminum stearate, may be added.

Preferably, the thermoplastic resin sheet used in the present invention is cross-linked prior to foaming. The method of crosslinking is optional, and includes, for example, the application of ionizing radiation to a sheet as molded, the addition of a heat-decomposable crosslinking agent during sheet formation and the crosslinking of the sheet during preheating, or the crosslinking with an alkoxysilane. The crosslinking with an alkoxysilane may be performed by a method comprising adding small amounts of the alkoxysilane and a heat-decomposable crosslinking agent as a catalyst to a thermoplastic resin, molding the mixture into a sheet, and crosslinking it during preheating, or by a method comprising reacting a thermoplastic resin with the alkoxysilane to form an alkoxysilane-modified resin, adding a silanol condensation catalyst to the resin, molding the mixture into a sheet, and crosslinking the sheet with steam or water, etc.

The ionizing radiation rays are radioactive rays conventionally used for the crosslinking of synthetic resins, such as electron beams, X-rays, $\beta$-rays, or $\gamma$-rays. The dose of the ionizing radiation is not limited at all, and can be determined optionally according to the required degree of crosslinking. Generally, the dose is 0.5 to 20 Mrads.

The heat-decomposable crosslinking agent preferably has a decomposition temperature somewhat lower (preferably about 20° C. lower) than the decomposition temperature of the heat-decomposable blowing agent used. Such cross-linking agents include dicumyl peroxide, 2,5-dimethyl-2,5-di(tertiary butyl peroxy) hexane, di-tertiary butyl perterephthalate, 1,9-nonane-bis-sulfonazide, and n-octadecyl azide formate.

The alkoxysilane is a compound expressed by the general formula $RR'SiY_2$ in which R is a monovalent olefinically unsaturated group composed of carbon and hydrogen and if desired oxygen, which is bonded to silicon by a silicon-carbon bond, Y is a hydrolyzable organic group selected from the class consisting of alkoxy, alkoxyalkoxy and acyloxy groups having less than 6 carbon atoms and oxime groups containing less than 14 carbon atoms, and R' is identical to R and Y or represents a monovalent hydrocarbon group free from aliphatic unsaturation. Examples of the alkoxysilane are vinyltriethoxy silane, vinyltrimethoxy silane, vinylmethyldiethoxy silane, and vinylphenyldimethoxy silane. The amount of the alkoxysilane is not limited at all. The preferred amount is 0.1 to 20 parts by weight, especially 0.5 to 10 parts by weight, per 100 parts by weight of the resin.

The silanol condensation catalyst has an action of promoting the formation of a siloxane bond in the presence of water by removing the hydrolyzable alkoxy, alkoxyalkoxy, acyloxy or oxime group attached to silicon. Examples of the silanol condensation catalyst include metal salts of carboxylic acids such as dibutyltin dilaurate, dibutyltin dioctate, zinc 2-ethylhexanoate or cobalt naphthenate, titanium chelate compounds such as bis(acetylacetonyl) diisopropyl titanate, tetranonyl titanate or ethylene glycol titanate, organometallic compounds such as alkyl titanates or tetrabutyl zirconate, organic bases such as ethylamine or piperidine, and organic acids such as p-toluenesulfonic acid.

In addition to the compounds described hereinabove, the thermoplastic resins may, as needed, contain conventional additives, for example, slip agents such as paraffin or stearic acid, fillers such as calcium carbonate or carbon black, antioxidants such as 2,6-ditertiary butyl hydroxytoluene, plasticizers such as dioctyl phthalate, and fire retardants.

BRIEF DESCRIPTION OF THE DRAWINGS

The present invention is described in greater detail by reference to the accompanying drawings in which:

FIG. 2 is a side elevation of a sheet-extending device preferably used in the present invention; and FIG. 3 is a cross-section taken along the line III—III of FIG. 2.

DETAILED DESCRIPTION OF THE INVENTION

Figure 1:
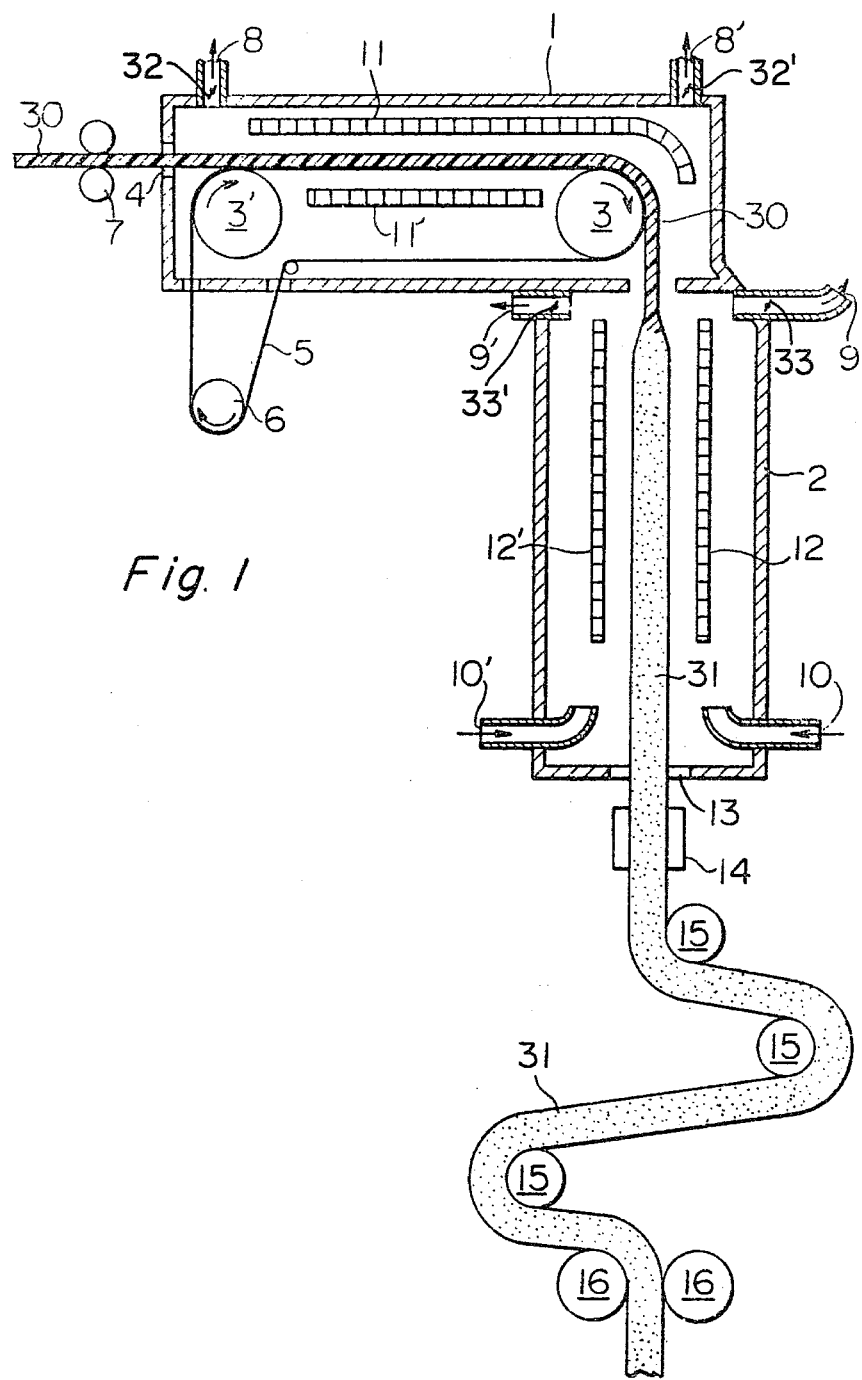
FIG. 1 is a longitudinal sectional view, partly broken away, of a preferred embodiment of an apparatus for carrying out the process of the invention.

Referring to FIG. 1, the reference numeral 1 represents a preheating chamber and 2, a foaming chamber. A thermoplastic resin sheet 30 containing a blowing agent is first fed to the preheating chamber 1 continuously from a feed opening 4 by means of a pair of feed rolls 7, and preheated within the preheating chamber 1.

Within the preheating chamber 1 is provided a conveyor means (belt conveyor) composed of an endless belt 5, a pair of pulleys 3,3' and a drive wheel 6. The endless belt 5 is extended horizontal between the pulleys 3,3'. The sheet 30 is placed on the belt 5 and supported thereon horizontally. The endless belt 5 is preferably made of a material which can withstand use for long periods of time at the temperature of the preheating chamber, for example, a metal plate, a wire gauze or a glass fabric. Preferably, the surface of the endless belt 5 is surface-treated to have good releasability, so that the sheet 30 which is softened as a result of preheating will not stick to the belt 5. For example, this can be accomplished by coating with a fluorine resin or a mold releasing agent such as silicone oils.

The conveyor means is not limited to the belt conveyor described, but may be any other type which can continuously convey the sheet 30 in a horizontal state. For example, a roller conveyor, or a means adapted to convey the sheet 30 while holding both edges thereof can also be used. The belt conveyor is, however, especially preferred since it has a large area of contact with the sheet 30.

The speed of conveying by the conveyor means is determined according to the correlation among the preheating temperature, the heat-foaming temperature, the length of each chamber, and the type of the resin forming the sheet 30, etc., and will vary accordingly. Generally, the conveying speed should be sufficient to permit the full preheating of the sheet 30 within the preheating chamber 1.

The preheating chamber further includes heating means 11, 11' for preheating the sheet 30 as it is conveyed by the conveyor means coninuously in the horizontally supported condition. An infrared ray source, an electric heater, or a jet of hot air, etc. may be used as needed as a heat source for the heating means. As shown, the heating means 11, 11' may be provided above and beneath the endless belt 5 on which the sheet 30 is placed. This manner of arrangement of the heating means within the preheating chamber 1 is preferred because it can ensure a uniform preheating of both surfaces of the sheet 30. Preheating is controlled by the heating means 11, 11'. For the production of a foamed sheet of good quality, it is desirable to preheat the sheet to a temperature such that the sheet 30 attains a state just before the beginning of foaming, that is, to a temperature such that the sheet 30 immediately begins to be foamed when it has left the conveyor means and enters the foaming chamber.

The foaming chamber is connected to the preheating chamber 1, and the sheet preheated in the preheating chamber in the manner described above is heat-foamed in foaming chamber 2 to form a foamed sheet 31. Stated in greater detail, the foaming chamber is arranged perpendicularly beneath the terminal or downstream end portion of the conveyor means (belt conveyor), (that is, below pulley 3 in the drawing). The perpendicular arrangement of the foaming chamber 2 means that the foaming chamber 2 is arranged so that the line connecting the inlet and exit of the foaming chamber 2 is perpendicular. By arranging it in this way, the preheated sheet 30 is suspended after it has departed the preheating chamber. Since the foaming chamber is provided beneath the terminal or end portion of the conveyor means, the sheet 30 can be suspended by the end portion of the conveyor means, and it is not necessary to provide a separate suspender or similar devices.

A pair of heaters 12, 12' are provided inside the foaming chamber 2, and the preheated sheet 30 is heated to a temperature above the decomposition temperature of the blowing agent during passage of the sheet between the heaters 12 and 12' to produce a foamed sheet 31. Since the sheet 30 abruptly increases in thickness, width and length at the time of foaming, the foamed sheet 31 frequently develops wrinkles along its lengthwise direction when it has just passed between the heaters 12 and 12'. In such a case, it is desirable to extend the resulting foamed sheet 31 so as to prevent the superposition or sticking of the wrinkles. To this end, the sheet which has been foamed can be extended by a suitable sheet extending device provided above (within the chamber) or below (outside the chamber) an exit 13 of the foaming chamber.

The heaters 12, 12' may be the same devices as the heating means 11, 11' provided within the preheating chamber 1. In order to keep a uniform and high temperature within the foaming chamber, it is desirable to send hot air into the chamber simultaneously with the heating by heaters 12 and 12'. Curved pipes 10, 10' are provided at the lower portion of the foaming chamber as ducts for supplying hot air for this purpose. Gas exhaust ports 9,9' and 8,8' are provided at the upper part of the foaming chamber and at the upper part of the preheating chamber, respectively. Dampers 33, 33' and 32, 32' are provided inside each exhaust port so as to adjust the amount of gas exhausted.

The extended foamed sheet 31 is cooled by cooling rolls 15, and taken up by a take-up means 16 consisting of a pair of pinch rolls. It is then wound up (not shown), and cut (not shown) to finished products.

The details of the sheet extending device are shown in FIGS. 2 and 3. In FIGS. 2 and 3, the reference numerals 14 and 14' represent two extending devices of the same construction. They face each other and are spaced symmetrically from each other by a distance corresponding to the width of the expanded sheet. The reference numerals 17 and 17' represent suction devices, and sheet guide grooves 18 and 18' are each provided between opposing surfaces of each suction device 17 or 17'. The bottom or inner portion of each of the guide grooves 18 and 18' has a number of suction holes 19 and 19' which lead respectively to pressure reducing chambers 20 and 20' which are provided inside the suction devices 17 and 17', respectively. The suction holes 19 and 19' are designed to suck the outer air with vigor by discharging air from inside the pressure reducing chambers 20 and 20' through exhaust pipes 21 and 21' by means of a vacuum pump (not shown).

The width of each of the guide grooves 18 and 18' is determined according to the thickness of a sheet to be tentered, but generally it is about 1.5 to 3 times the thickness of the sheet.

Moving belts 22 and 22' having a plurality of air vents therethrough are provided on the bottom inner portions of the sheet guide grooves 18 and 18' so that they can slide over the surfaces of such inner in intimate contact therewith. The moving belts 22 and 22' are mounted on drive rollers 23 and 23' and guide rollers 24 and 24', and are adapted to be moved by the drive rollers 23 and 23' at the same velocity as the sheet take-up velocity. The moving belts 22 and 22' may be a cloth or a rubber belt provided with a number of small apertures.

Since conveyor means for conveying a thermoplastic resin sheet continuously in a horizontally supported state is provided within the preheating chamber in the apparatus of this invention, the sheet having foamability can be preheated on the conveyor means. The sheet does not undergo any effect of tension due to its own weight because it is supported by the conveyor means. Hence, as compared with the conventional vertical-type foaming apparatus, the foaming apparatus of the present invention reduces the likelihood of the foamed sheet being extended in its lengthwise direction, and can result in a foamed sheet having low heat shrinkage, good dimensional stability, and high commercial value. Furthermore, the curling of the sheet is reduced, and vibration of the sheet is avoided since the load of the sheet is exerted on the conveyor means while it is being preheated. Consequently, there is no fear of the contact of the sheet with the preheating chamber, and the sizes of the sheet feed opening and the aperture in a boundary wall between the preheating chamber and the foaming chamber can be decreased. In addition, a heating means such as a panel heater can be placed close to the sheet. Since in the apparatus of the invention, the preheating chamber is disposed horizontally, it is only within the foaming chamber that the sheet is conveyed in the perpendicular direction. Thus, even if the foamed sheet vibrates, the amplitude of vibration is smaller than in the conventional vertical-type foaming apparatus. This makes it possible to reduce the size of the sheet exit opening and to place the heating means closer to the sheet. Moreover, because the heat can not easily pass out of the chamber, the amount of heat flowing from the foaming chamber into the preheating chamber is decreased. Thus, heating can be accomplished with less energy, and the heat efficiency is improved. This also simplifies the temperature control of the preheating chamber, and the output of foamed sheet can be increased with a small-sized apparatus.

Another advantage of preheating the sheet on the conveyor means in the present invention is that, as compared with preheating the sheet while suspended in the air in the conventional vertical foaming apparatus, differences in temperature according to the thickness of sheet are small (for example, the difference in surface temperature between two points which differ in thickness by $10\mu$ is 0.3° C. in Example 1 to be given hereinbelow, whereas it is 1.5° C. in Comparative Example 2), and therefore, the sheet is uniformly heated to give a uniformly foamed sheet with good efficiency without the melt-adhesion of foams to one another or the curling of the edge portions of the foamed sheet during the foaming operation. Furthermore, since curling does not appreciably occur in the preheating chamber and foaming chamber, it is possible to produce a foamed sheet having a large width.

A further advantage of the invention is that in building an apparatus of a large size, it is not necessary to increase its height as in the case with the conventional vertical-type foaming apparatus, but it is sufficient to only lengthen the preheating chamber in the horizontal direction. Consequently, the apparatus as a whole can be made compact, and the building of the apparatus becomes simplified.

Furthermore, since in the apparatus employed in this invention, the foaming chamber is provided perpendicularly beneath the terminal or end portion of the conveyor means and the sheet does not make contact with machine parts at the time of foaming, there results the advantage of producing a foamed sheet of good quality in addition to the advantages which the conventional vertical-type foaming apparatus has.

The following Examples and Comparative Examples illustrate the present invention without any intention of limiting it. All parts in these examples are by weight unless otherwise specified.

The heat efficiency, yield and heat shrinkage values given in the examples are defined as follows:

(1) Heat efficiency (%)=(the energy required to heat the sheet from room temperature to 220° C.)*÷[the total energy used (the energy of electric power used for heaters + the energy of a liquefied petroleum gas used to produce hot air)]**×100

Note
*Value obtained by calculation
**Actual value of the energy required to heat the sheet (2) Yield (%)=(the total output−the amount of defective products)÷(the total output)×100

The defective products are, for example, (1) products with irregular thickness, (2) products with non-uniformity in color, (3) products having roughened and scarred surfaces, and (4) products partly having blow holes.

(3) Heat shrinkage (%)=[(the length of the foamed sheet in the sheet feeding direction before heating)−(the length of the foamed sheet after it has been heated at 70° C. for 22 hours and then cooled)]÷(the length of the foamed sheet in the sheet feeding direction before heating)×100

EXAMPLE 1

| | |
|---|---|
| Low-density polyethylene (melt index 2; molecular weight 42,000; density 0.917 g/cm$^3$) | 100 parts |
| Azodicarbonamide | 15 parts |
| Zinc oxide | 1 part |
| Lead stearate | 1 part |

The above ingredients were fed into a blender, and mixed with good stirring. The mixture was fed into an extruder (caliber 120 mm) fitted with a fan die, and extruded at 135° C. to form a sheet having a thickness of 1.3 mm and a width of 360 mm. The resulting sheet was fed into an electron beam accelerator (accelerating voltage 500 KV, maximum current 50 mA), and 2 Mrads of electron beams were applied to the sheet to cross link it. The degree of cross-linking (in terms of the percent by weight of the hot-xylene insoluble portion based on the entire weight of the cross-linked sheet) of the sheet was 42.3%.

The crosslinked sheet was fed into an apparatus of the type shown in FIG. 1 to obtain a foamed sheet.

The preheating chamber 1 had a length of 3 m, and was heated by panel heaters 11, 11' of an infrared source at 250° C. The foaming chamber 2 had a height of 3 m, and was heated by panel heaters 12, 12' and hot air at 200° to 250° C. The temperature of the hot air was about 180° C., and it was fed at a rate of about 4 m$^3$/sec. through hot air ducts 10,10'.

The crosslinked sheet was fed by means of feed rolls 7 through a feed opening 4 at a rate of 4 m/min., and conveyed on an endless belt 5. The sheet was sent to foaming chamber 2 as suspended from the terminal or downstream end portion of the endless belt. The temperature of the sheet at the terminal or end portion of the endless belt was 150° C. The sheet began to be expanded immediately upon being sent to the foaming chamber 2. The sheet foamed was delivered from outlet 13, extended by an extending device, and cooled by cooling rolls 15. It was then taken up by a take-up device 16 at a take-up rate of 14.2 m/min. The resulting foamed sheet had a thickness of 3.2 mm, a width of 1080 mm, and an expansion factor of about 30.

When the sheet was produced continuously for 12 hours, its yield was 91%, and the heat efficiency was 8.4%. The resulting sheet had a heat shrinkage of 0.53%. The results are shown in Table 1.

It is seen from a comparison of the results obtained in Comparative Examples 1 to 3 given hereinbelow that the present Example was superior with regard to the speed of production, heat efficiency, yield and heat-shrinkage.

COMPARATIVE EXAMPLE 1

A mixture of the same composition as used in Example 1 was extruded in the same way as in Example 1, and crosslinked by applying electron beam irradiation to form the same crosslinked sheet as in Example 1.

The resulting sheet was fed at a rate of 4 m/min. into a vertical foaming apparatus of the conventional type consisting of a preheating chamber and a foaming chamber.

In this foaming apparatus, the preheating chamber had a height of 2 m and a sheet feed opening was provided at the upper end of the preheating chamber so that the sheet was suspended from the opening. The inside of the preheating chamber was heated at about 250° C. by panel heaters and hot air. The foaming chamber had a height of 4 m and was heated internally by panel heaters and hot air at about 230° C. The above hot air had a temperature of about 180° C., and was fed into the preheating chamber and the foaming chamber at a rate of about 2 m³/sec. The sheet which left the foaming chamber was extended by the same extending device as used in Example 1.

The resulting product assumed an unstable foamed state. (In other words, since the heating of the sheet surface was non-uniform, incompletely foamed portions and excessively heated, coarsely and irregularly foamed portions occur in large numbers, and the surface of the foamed sheet was poor). Thus, the product was not satisfactory as a foamed sheet.

The results are shown in Table 1.

COMPARATIVE EXAMPLE 2

Using the same crosslinked sheet as used in Comparative Example 1 and the same vertical foaming apparatus as used in Comparative Example 1, the heat-foaming of the sheet was performed under the same conditions as in Comparative Example 1 except that the rate of sheet feeding was changed to 2.8 m/min.

It was found that the sheet stretched drastically during the heat-foaming, and therefore, the width of the resulting foamed sheet decreased. Moreover, the wrinkles generated at the time of foaming frequently melt-adhered to one another, and the end portions of the foamed sheet were frequently curled. Thus, it was impossible to afford good products by continuous operation.

The results are shown in Table 1.

COMPARATIVE EXAMPLE 3

A crosslinked sheet having a degree of crosslinking of 44.6% was prepared in the same way as in Example 1 except that the dose of electron beams was changed to 2.3 Mrads. The resulting crosslinked sheet was heat-foamed by the same method as in Comparative Example 2.

The speed of the foamed sheet leaving the exit was 11.2 m/min. The final product had a thickness of 2.9 mm, and an expansion factor of about 30. The sheet, however, broke sometimes in the heat-foaming chamber.

When the sheet was produced continuously for 12 hours, the yield was 85%, and the heat efficiency was 4.8%. The resulting foamed sheet has a heat shrinkage of 1.86%.

The results are shown in Table 1.

Table 1

| | Rate at the inlet opening (m/min.) | Degree of cross-linking (%) | Thickness of the product (mm) | Yield (%) | Heat efficiency (%) | Heat shrinkage (%) |
|---|---|---|---|---|---|---|
| Example 1 | 4 | 42.3 | 3.2 | 91 | 8.4 | 0.53 |
| Comparative Example 1 | 4 | 42.3 | The foamed state unstable; difficult to produce good products | | | |
| Comparative Example 2 | 2.8 | 42.3 | Because of frequent troubles, continuous operation was difficult | | | |
| Comparative Example 3 | 2.8 | 44.6 | 2.9 | 85 | 4.8 | 1.86 |

EXAMPLE 2

| | |
|---|---|
| Low-density polyethylene (melt index 2; molecular weight 42000; density 0.917 g/cm³) | 100 parts |
| Azodicarbonamide | 15 parts |
| Zinc oxide | 1 part |
| Lead stearate | 1 part |
| Dicumyl peroxide | 1 part |

The above ingredients were fed into a blender, and mixed with good stirring. The mixture was fed into an extruder (caliber 120 mm) fitted with a fan die, and extruded at 135° C. to form a sheet having a thickness of 2.1 mm and a width of 300 mm. The resulting sheet was foamed using the same foaming apparatus as used in Example 1 under the same conditions as in Example 1 except that the sheet feeding rate was changed to 0.5 m/min., the take-up rate was changed to 1.8 m/min., and the temperature of the sheet at the exit of the preheating chamber was maintained at 150° C. The sheet was cross-linked at the time of preheating.

The resulting foamed sheet had a thickness of 5 mm and a width of 1000 mm with an expansion factor of about 30. The expansion was uniform, and the surface of the foamed sheet was beautiful.

EXAMPLE 3

| | |
|---|---|
| Low-density polyethylene (density 0.917 g/cm³) | 100 parts |
| Azodicarbonamide | 15 parts |
| Zinc oxide | 1 part |
| Lead stearate | 1 part |
| Vinyltriethoxy silane | 1 part |
| 2,5-Dimethyl-2,5-di(tertiary peroxy) hexane | 0.1 part |

A blend having the above composition was extruded through an extruder in the same way as in Example 2 to afford a sheet having a thickness of 2.1 mm and a width of 300 mm.

The sheet was foamed by the same foaming apparatus as used in Example 1 under the same conditions as in Example 1 except that the sheet feed rate was changed to 1.5 m/min., the take-up rate was changed to 5.4 m/min., and the temperature of the sheet at the exit of the preheating chamber was maintained at 170° C. The sheet was cross-linked at the time of preheating. The resulting foamed sheet showed a beautiful surface, and had a thickness of 5 mm and a width of 1000 mm with an expansion factor of about 30.

What we claim is:

1. A process for continuously producing a foamed sheet from a thermoplastic resin sheet containing a heat-decomposable blowing agent, said process comprising:
   providing a thermoplastic resin sheet containing a heat-decomposable blowing agent;
   supplying said sheet onto a conveyor and conveying said sheet horizontally by means of said conveyor;
   supplying heat to said sheet, both from above and below said sheet, while said sheet is conveyed horizontally, and thereby heating said sheet to a temperature below the decomposition temperature of said blowing agent;
   discharging said sheet from said conveyor and suspending the thus discharged sheet vertically;
   heating the thus vertically suspended sheet to a temperature above said decomposition temperature, and thereby foaming said sheet; and
   extending the thus foamed sheet by a sheet extending device.

2. A process as claimed in claim 1, wherein said conveyor means is a belt conveyor.

3. A process as claimed in claim 2, wehrein the belt of said belt conveyor is made of metal plate.

4. A process as claimed in claim 2, wherein the belt of said belt conveyor is made of wire gauze.

5. A process as claimed in claim 4, further comprising treating the surface of said belt conveyor to permit easy releasing of said sheet.

6. A process as claimed in claim 1, wherein said step of supplying heat to said sheet is conducted by means of infrared rays.

7. A process as claimed in claim 1, wherein said thermoplastic resin is an ethylenic resin.

8. A process as claimed in claim 7, wherein said ethylenic resin is a low-density polyethylene.

9. A process as claimed in claim 1, wherein said heat-decomposable blowing agent is azodicarbonamide.

10. A process as claimed in claim 1, wherein said thermoplastic resin sheet further contains a foaming aid.

11. A process as claimed in claim 1, wherein said step of providing said thermoplastic resin sheet comprises kneading and extruding said resin at a temperature higher than the melting temperature of said resin but lower than said decomposition temperature of said heat-decomposable blowing agent.

12. A process as claimed in claim 1, further comprising cross-linking said thermoplastic resin sheet by applying ionizing radiation.

13. A process as claimed in claim 1, wherein said thermoplastic resin sheet further contains a cross-linking agent.

14. A process as claimed in claim 13, wherein said heat-decomposable blowing agent is azodicarbonamide.

15. A process as claimed in claim 13, wherein said step of providing said thermoplastic resin sheet comprises kneading and extruding said resin at a temperature higher than the melting temperature of said resin and lower than the temperature at which said cross-linking agent is active.

16. A process as claimed in claim 13, wherein said cross-linking agent is a heat-decomposable cross-linking agent.

17. A process as claimed in claim 16, wherein said heat-decomposable cross-linking agent is dicumyl peroxide.

18. A process as claimed in claim 13, wherein said cross-linking agent is a mixture of an alkoxysilane and a heat-decomposable cross-linking agent.

19. A process as claimed in claim 18, wherein said alkoxysilane is divinyltriethyl silane.

20. A process as claimed in claim 18, wherein said heat-decomposable cross-linking agent is 2,5-dimethyl-2,5-di(tertiary butyl peroxy) hexane.

21. A process as claimed in claim 1, wherein said step of providing said thermoplastic resin sheet comprises reacting a thermoplastic resin with an alkoxysilane, adding a silanol condensation catalyst to the resulting alkoxysilane-modified resin, molding the mixture into a sheet, and cross-linking said sheet with steam or water.

* * * * *